3,223,620
CORROSION INHIBITION
Alfred W. Oberhofer, Alsip, Ill., assignor to Nalco Chemical Company, Chicago, Ill., a corporation of Delaware
No Drawing. Filed July 9, 1963, Ser. No. 293,835
8 Claims. (Cl. 210—30)

This invention relates to a process for maintaining a non-corrosive environment in industrial process water systems. The invention is particularly concerned with the maintenance of chromate salt concentrations in aqueous fluids which have been treated with these salts for purposes of rendering them non-corrosive to various metals. A particular area to which the invention relates is that of treating waste fluids which contain chromate salts, whereby these salts are removed prior to their being disposed thereby rendering such fluids non-objectionable from the standpoint of stream or sewage pollution problems.

Water is commonly used as a heat transfer media in a variety of industrial systems. These waters frequently are high in dissolved solids, are corrosive and must be obtained from a wide variety of sources. To overcome the corrosive tendencies of these waters, it is customary to treat them with corrosion inhibiting chemicals to render them non-corrosive to the various metal components of heat exchange and cooling systems. When these waters are circulated through cooling towers, losses of water due to evaporation and windage result. Due to these losses the dissolved solids and corrosion inhibitors tend to concentrate to an undesirable level.

Common corrosion inhibitors used in the treatment of industrial cooling waters are the well-known alkali metal chromates.

When a cooling tower which has been treated with chromate corrosion inhibitors reaches a certain concentration level of dissolved solids, it is customary to blow it down by discharging a portion of the water and adding thereto fresh makeup having a lower dissolved solids content. Frequently such blowdown waters contain from 1–500, and sometimes even 1,000, parts per million of chromate and many times that amount of other dissolved salts, such as for example alkali metal chlorides, sulfates, carbonates, nitrates and the like. Typical cooling tower blowdown water might contain, for example, 20 parts per million of a chromate salt and 1200 parts per million of other dissolved salts such as sodium chloride, calcium sulfate, magnesium nitrate, and the like.

When such waters are discharged to streams and to sewage systems, the chromate content oftentimes make them non-acceptable under local regulations. By utilizing the practices of the invention it is possible to take such waters, treat them in accordance with the process steps to be described, and allow the chromate content to be reused, with the chromate-free water disposed of safely in local disposal systems.

It would be beneficial if it were possible to remove chromates from industrial wastes, particularly blowdown values from cooling towers, and at the same time neutralize these materials as corrosion inhibitors, thereby tending to maintain a relatively non-corrosive environment in industrial process water systems. It therefore becomes an object of the invention to provide a method for removing chromates from various types of industrial process water systems and particularly to remove chromates from industrial process water systems which are relatively high in dissolved solids.

A prime object of the invention is to provide a method of removing chromates from industrial process water systems and to collect these values in a usable form whereby they are capable of again being utilized as corrosion inhibiting chemicals. Other objects will appear hereinafter.

In accordance with the invention it has been found that a non-corrosive environment for industrial process water systems may be provided by a novel process for maintaining within such systems a chromate-based corrosion inhibitor. This inhibitor is maintained at a useful concentration by treating blowdown or used high dissolved solid waters removed from such systems with a strong base anion exchange resin which has as its exchangeable anion the anion of a strong mineral acid. To be effective, it is necessary that the chromate containing water contacted with the strong base anion exchange resin be adjusted in pH or at least have an initial pH not greater than 6.5. Preferably the pH of such waters is within the range of 4.0 to 6.0. After the chromate containing water has contacted the strong base anion exchange resin it will be shown that substantially all of the chromate is selectively retained by the anion exchange resin, with the remainder of dissolved solids in the water passing on as a waste fraction which may be safely disposed of by conventional means. After the resin is substantially saturated with chromate, the invention further contemplates, as a portion of its operational steps, the treatment of such chromate-loaded anion exchange resin with a regenerating salt solution which contains a mineral acid salt solution which has a pH greater than 9.5 and preferably within the range of 10.5 to 13.5. This treatment of the chromate-loaded anion exchange resin with the pH adjusted strong mineral acid salt solution selectively displaces the chromate from the resin and places the resin in a suitable salt form capable of treating further chromate-laden process waters.

In a preferred embodiment of the invention, the pH adjusted mineral acid salt solution is used to treat chromate laden strong base anion exchange resins until the regenerant solution contains a substantial quantity of chromate and is relatively depleted of strong mineral acid salt. This solution then may be returned to industrial process water systems whereby the chromate is again utilized for further protecting various types of metals against corrosion.

When chromate compounds or salts are used to treat industrial process waters, particularly cooling towers, the most common forms of these materials used are the hexavalent alkali metal salts exemplified by sodium chromate and sodium dichromate. While the invention is particularly valuble for treating process waters containing these compounds, it is understood that the invention has applicability to the treatment of waters containing hexavalent chromium compounds of all types. When the alkali metal chromates are used to treat cooling towers, they are usually used at a dosage of from a few parts per million to as much as a thousand parts per million, with their use being accompanied by careful pH control, usually within the range of 5.0 to 8.0. In many instances it is common to use other corrosion inhibiting chemicals in conjunction with the chromates, with a particularly effective combination being the use of molecularly dehydrated phosphates in combination with the alkali metal chromates. Such type of corrosion inhibitors are described in detail in the specification of U.S. Patent 2,771,391.

As indicated, the first step of the invention requires that the starting solutions containing the chromates to be removed must first have their pH adjusted to a range not greater than 6.5. This adjustment in some instances may not be necessary, particularly if the blowdown is from a cooling tower that is operating in an acidic pH range. In this case, such materials may be considered to have been pH adjusted and the expression, "adjusting the pH of the blowdown fraction to not greater than 6.5," is intended to include such waters as received for the anion exchange processing whether they are already at a pH of 6.5 or less or are adjusted as a separate treating step.

By contacting the strong base anion exchange resin in the mineral acid form with the chromate containing solutions it has been surprisingly found that the chromate is selectively removed in preference to the other dissolved ionized anionic materials contained in the water. This selective removal allows the resin to become nearly saturated exclusively with chromate ions. To permit this particular saturation of the resin with chromate it is important that the strong base anion resin be in the strong mineral acid salt form, viz., either the halide, sulfate, nitrate or phosphate form. It is particularly interesting to note that the nitrate form of the resin is most desirable, since the use of a specific nitrate regenerating solution, hereinafter described more fully, allows a large quantity of chromate salts to be loaded onto the resin in a subsequent exhaustion cycle.

The strong base anion exchange resin may be selected from a wide variety of known strong base anion exchange resins. It is preferred to use backbone copolymers of styrene and divinylbenzene. For a detailed description of the various strong base anion exchange resins which are commercially available, reference may be had to the well-known work, Ion Exchange Technology, by Nachod and Schubert, Academic Press (1956). Particularly useful are the commercial resins Nalcite SBR and Nalcite SBR-P. These resins are described in the teachings of U.S. Patent 2,591,573. The chromate containing waters may contact the anion exchange resin in accordance with customary ion exchange practices. It has been noted that leakage is minimized when the flow rate is adjusted so that it is approximately 2.5 gallons per minute per square foot of resin area. After the anion resin has been exhausted with chromate, an important concept of the invention resides in the treatment of such resin with a special aqueous regenerant solution which selectively removes the chromate from the resin and collects it in a relatively concentrated condition for its subsequent reuse in industrial process waters.

The particular regenerant solution used to treat chromate exhausted resins comprises an aqueous solution of a salt of an inorganic mineral acid, with the pH of such solutions being adjusted to within the range of 10.5 to 13.5 and preferably about 11.5. In some instances it is possible to allow the pH to be as low as 8.5, although the preferred range of 10.5 to 13.5 gives optimum chromate removal from the anion exchange resin.

Exemplary of the salts of inorganic mineral acids that may be used to regenerate the chromate form resin, are the well-known alkali metal halides, sodium chloride, sodium nitrate, potassium nitrate, sodium sulfate, potassium sulfate, sodium phosphate, particularly trisodium phosphate, and the like. The regenerants may be used at dosages to provide from 10 to 50 pounds of salt regenerant per cubic foot of resin, with 20 pounds of regenerant, or less, giving adequate chromate stripping in most cases.

In the case of some of the salts, it is necessary that the pH be adjusted with an alkaline material, with sodium hydroxide being preferred due to its ease of solution and ready commercial availabiility. Typical regenerant solutions would contain, on pounds regenerant per cubic foot of resin basis, 20 pounds of sodium nitrate and 1.25 pounds of caustic, or 20 pounds of sodium fluoride and 1 pound of sodium hydroxide.

Large excesses of salts over and above those specified are not necessary, since in most cases the efficiency of chromate removal is far in excess of 95%. Laboratory experiments have shown, as will be illustrated later, the preferred regenerant is a sodium nitrate solution which has been adjusted to a pH of approximately 11.5. This referred regenerant, when used at a relatively low dosage, gives a very high chromate removal from the resin.

Since it is desirable to obtain maximum chromate recovery, it has been found that it is possible to reuse the regenerant until it is substantially depleted of regenerant salt and the chromate concentration is built up to a point where it may be economically recycled into the system using chromates as a corrosion inhibiting chemical. Due to equilibrium factors, it is possible to apply the same regenerant solution to several regenerating cycles until the regenerant salt is spent, or an equilibrium condition diminishing the regeneration efficiency occurs. It is therefore obvious to those skilled in the art that the various alkali mineral salts solutions may be used to treat a chromate saturated resin to remove chromate and to continue to treat with this regenerant until an equilibrium has been reached. At such time additional regenerant may be added to the solution, or the particular solution may be used to treat other more highly loaded chromate form anion exchange resins.

For purposes of showing the various aspects of the invention the following are presented by way of example:

EXAMPLE I

This particular series of tests shows the ability of strong base anion exchange resins in the mineral acid anion form to selectively remove chromates from waters containing other dissolved solids.

*Test water.*—The test water used in all experiments was made up to the following analysis (except as stated otherwise):

| | P.p.m. |
|---|---|
| Ca as $CaCO_3$ | 220 |
| Mg as $CaCO_3$ | 500 |
| Al as Al | 0.56 |
| Zn as Zn | 2.35 |
| Cl as NaCl | 340 |
| $SO_4$ as $Na_2SO_4$ | 1100 |
| $PO_4$ as $PO_4$ | 2.1 |
| $CrO_4$ as $CrO_3$ | 50.0 |
| $NO_3$ as $NO_3$ | trace | pH of final solution: 6.05.

The pH of the water was adjusted to pH 6.05 with $H_2SO_4$. This analysis indicates the final composition after all adjustments have been made. The chromate content represents approximately twice the amount normally present in typical cooling tower blowdown water. This increased amount was employed to decrease exhaustion time.

COMPARATIVE TESTING OF ANION RESINS

This work was done to select the resins best suited for selective removal of small amounts of chromates from water containing large amounts of other anions, such as sulfates and chlorides.

The resins employed are indicated in Table IA; 75 ml. of each resin were placed in ½ inch I.D. Lucite columns. The resins were regenerated with caustic, rinsed and backwashed. Resin bed heights were 22½ inches.

The test water was passed through the resins at a rate of 1 g.p.m. per ft.$^3$ of bed. A separate experiment established that higher flow rates resulted in somewhat higher chromate leakage during exhaustion, but that the specified rate minimized such leakage.

Table IA

EXHAUSTION OF ANION RESINS

| Gals. through per 75 ml. resin bed | Resin types and chromate leakage (in p.p.m. $CrO_3$) | | | |
|---|---|---|---|---|
| | Dowex 1 [1] | Nalcite SBR [2] | Nalcite SAR [2] | Nalcite SBR-P [2] |
| 1 | 0 | 0 | 0 | 0 |
| 2 | 0 | 0 | 0 | 0 |
| 3 | 0 | 0 | 0.08 | 0 |
| 4 | 0 | 0 | 0.16 | 0.01 |
| 5 | 0.02 | 0.02 | 0.60 | 0.10 |
| 5½ | 0.03 | 0.03 | 1.45 | 0.15 |
| 6 | 0.25 | 0.21 | 4.2 | 0.40 |
| 6½ | 1.0 | 1.0 | 14.3 | 1.45 |
| 7 | 1.75 | 2.0 | 17.0 | 2.2 |
| 7¾ | 4.8 | 5.0 | 24.0 | 5.8 |
| 8¾ | 7.0 | 8.2 | 30.0 | 22.0 |
| 9½ | 10.2 | 11.0 | 32.0 | 26.0 |
| 10 | 13.0 | 14.8 | | 27.5 |
| 11 | 18.0 | 20.2 | | 30.5 |
| 12 | 26.5 | 27.0 | | 32.0 |
| 13 | 32.0 | 32.0 | | 32.0 |

[1] "Dowex"—Trademark of The Dow Chemical Company.
[2] "Nalcite"—Trademark of Nalco Chemical Company.

Although all of the exchangers were remarkably effective, Dowex 1 and Nalcite SBR appeared to give maximum capacity and minimum chromate leakage. Further test work with Nalcite SBR is reported as typical of strongly basic anion resin behavior.

CAPACITY AND LEAKAGE OF NALCITE SBR

Run 1—Effect of pH 6.05: Three 100 ml. beds of Nalcite SBR were placed in ½ inch I.D. columns, resulting in 30 inch bed heights. The resins were converted to the ionic forms indicated in Table IB and exhausted to the test solution:

Table IB

THROUGHPUT AND LEAKAGE OF NALCITE SBR; EFFECT OF RESIN SALT FORM

| Throughput, gals./ft. | Leakage in p.p.m. $CrO_3$ (influent 50 p.p.m. $CrO_3$) | | |
|---|---|---|---|
| | $SO_4^{-1}$ form | $NO_3^{-2}$ form | $Cl^{-3}$ form |
| 283 | 0 | 0 | 0 |
| 570 | 0 | 0 | 0 |
| 1,400 | 0 | 0 | 0 |
| 1,700 | 0 | 0 | 0 |
| 3,100 | 0.06 ← | → same ← | → same |
| 3,960 | 0.36 | same | same |
| 4,400 | 0.45 | same | same |
| 4,700 | 0.55 | same | same |
| 5,500 | 1.3 | same | same |
| 5,800 | 1.65 | same | same |
| 6,600 | 3.0 | same | same |
| 6,800 | 3.4 | same | same |

The test water was applied at a flow rate of 2½ g.p.m./ft.² The pH of the treated water from all columns averaged 6.55.

Run 2—Effect of pH 6.35: Three columns were prepared as described in Run 1. The test water was adjusted to pH 6.35 by addition of NaOH. These runs were made to study the effect of higher pH upon the capacity of SBR for chromates, since it was suspected that the unexpectedly high capacity of SBR was caused by the pH of the water (pH 6.05) in Run 1.

The throughput obtained in these runs, to the same leakage end point, was only 4400 gals. per ft.³ A higher initial leakage was observed: average leakage was approximately 0.15 p.p.m. for the first half of the runs, the second portions averaged 1.6 p.p.m. $CrO_3$ leakage. Average pH of the treated water was 6.60 from all columns.

Runs 3 and 4—Regeneration studies: These exhaustions were made for the purpose of regeneration studies. The runs were made on 6 separate columns, 100 ml. each, of Nalcite SBR, nitrate form. Capacities and leakages of all columns were identical to that obtained in Table IB, $NO_3$ form resin.

The exhaustion to 6800 gallons of test water per cubic foot of resin containing 50 p.p.m. $CrO_3$ is equivalent to a total chromate capacity of approximately 2.5–2.8 lbs. of $CrO_3$ per cubic foot of resin. Exhausted columns showed an orange color, typical for dichromates, extending ¼ to ⅓ down from the top. The remainder of the column was slightly yellow.

EXAMPLE II

This example demonstrates that chromates may readily be removed from chromate saturated strong base anion exhange resins by use of regenerant solutions containing salts of mineral acids in which the solutions have been adjusted to certain critical pH ranges. The results of use of conventional regenerants without pH adjustment are shown for comparison.

SELECTION OF OPTIMUM REGENERANT CONDITIONS

The sample sized used for preliminary tests was 5 ml., which allowed approximate estimates of the amounts of regenerant required for large scale work. Each column was exhausted to chromate by the test water.

The first series of experiments were made with 10% solutions of NaOH, NaCl, $Na_2SO_4$, and $NaNO_3$. The approximate amounts of regenerant per cubic foot of resin required to obtain a 95 to 99% regeneration were: NaOH, 200 lbs.; $NaNO_3$, 250 lbs.; NaCl, 350 to 400 lbs.; and $Na_2SO_4$, 300 lbs. The pH of the salt solutions was not adjusted in this series.

The second experiments were made with $Na_2SO_4$ and $NaNO_3$ solutions, but with small additions of sodium hydroxide (to pH 11.5). Alkali addition was made to convert dichromates on the resin exchange sites to chromates, which are more easily eluted from the resin than dichromates. Results were as follows: a 99 to 100% chromate strip was obtained with 60 lbs. of $NaNO_3$ when the pH of the regenerant solution was adjusted to 11.5. A 10% solution of $Na_2SO_4$ (pH 11.5) did not perform as well as $NaNO_3$: 150 to 170 pounds were necessary to reach a 90–95% regeneration level.

The use of sodium hydroxide as sole regenerant is ruled out for two reasons: its high cost and need for a secondary regeneration. The hydroxide regenerated resin requires subsequent conversion to a salt form, since cooling tower blowdown water usually contains large amounts of calcium and magnesium which would otherwise precipitate on the resin in the hydroxide form as a result of salt splitting.

REGENERANT EFFICIENCY VS. CONCENTRATION AND NaOH ADDITION

The following regenerations were carried out with Nalcite SBR columns exhausted to chromates by application of the test water. Each column was therefore equally exhausted with dichromates and chromates, plus other anions such as sulfate, chloride and phosphates. Before regeneration, all resins were backwashed; regenerant contact time was approximately one hour, at a flow rate of ½ g.p.m./ft.³

$NaNO_3$ plus NaOH: Best regenerations were obtained with 20 pounds of $NaNo_3$ plus 1 to 1.25 pounds of NaOH per cubic foot.

The following values were obtained when the pH of the regenerant was varied (20 lbs $NaNO_3$/cu. ft. constant in all cases): addition of 1.25 lbs. NaOH/ft.³ strips 99% of the $CrO_3$; 1.0 lb. NaOH/ft.³ regenerates off 95%; 0.63 lb. NaOH/ft.³ strips 72% of the total chromates on the resin. One pound of NaOH/ft.³ addition to the salt regenerant appears to be a satisfactory, practical alkalinity adjustment.

$Na_2SO_4$ plus NaOH: The effects of concentration of $Na_2SO_4$ solution (10% and 1.6% at pH 11.5) were first compared. The elution curves indicated that low concentrations of $Na_2SO_4$ are more effective: at 1.6% concentration, 58 lbs./ft.$^3$ regenerates off 100% of the chromates, and 20 lbs. will remove 60%, while 170 lbs. of 10% $Na_2SO_4$ are required for full regeneration (100% strip). Additional studies of the effect of concentration were made on separate resin beds (50 ml. samples exhausted with amounts of chromates and dichromates), equivalent to that used in exhaustion of 100 ml. resin beds. Optimum $Na_2SO_4$ regenerant concentration appeared to be in the range of 1.5 to 5.0%.

Each resin was regenerated with an equivalent of 20 lbs. $Na_2SO_4$ plus 1 lb. NaOH/ft.$^3$

| Percent concentration of $Na_2SO_4$ solution | Percent $CrO_3$ stripped |
|---|---|
| 1.0 | 46 |
| 1.6 | 55–60 |
| 2.0 | 45 |
| 4.0 | 37 |
| 6.0 | 36 |
| 10.0 | 18 |

These results indicate that although $NaNO_3$ is a more efficient resin than $Na_2SO_4$, the efficiency of the latter is improved when the pH is controlled to the 11.0–11.5 range.

NaCl plus NaOH: In experiments conducted with 10% NaCl as regenerant, at 20 lbs. NaCl plus 1 lb. NaOH/ft.$^3$, 95% of the chromates were removed. Sodium chloride appears to be an efficient chromates regenerant when pH is controlled.

EXAMPLE III

This example shows the reuse of spent regenerant over a number of cycles to obtain maximum chromate recovery, and to further minimize regeneration costs.

REUSE OF THE SPENT REGENERANT FOR ADDITIONAL CYCLES

These experiments were conducted to determine feasibility of spent regenerant reuse for additional regenerations, and to establish the maximum chromate concentration in the spent regenerant leading to recovery and reuse in cooling tower applications.

PRELIMINARY EXPERIMENTS

To facilitate testing of regenerants for reuse in additional cycles, the following experiments were undertaken:

Five ½ inch diameter columns of Nalcite SBR, 50 ml. each, were set up; the exchange sites were converted to $NO_3^-$ form before exhaustion with chromates and regeneration with the regenerant, $NaNO_3$. The resins were selectively exhausted with 3.12 pounds of $CrO_3$/ft.$^3$ through application of the test water, then rinsed briefly with deionized water.

$NaNO_3$ regeneration: The starting regenerant material was equivalent to 20 pounds of $NaNO_3$ per cubic foot as a 10% solution, with one pound of NaOH for pH adjustment. This solution was applied sequentially to a total of 5 exhausted columns for regeneration, with addition of one pound of NaOH (per cubic foot equivalent) to the solution prior to regeneration of each column. Regenerant contact time was one hour. The ionic form of the resin prior to regeneration was primarily chromate, with lesser amounts of nitrate remaining on the column after bed exhaustion. The results are illustrated in Table IIIA.

Table IIIA

REUSE OF $NaNO_3$ REGENERANT FOR A TOTAL OF FIVE COLUMN REGENERATIONS

| Column No. | Percent $CrO_3$ recovered from column (of 3.12 lb./ft.$^3$) | Lbs. $CrO_3$ recovered per column (per ft.$^3$) | Lbs. $CrO_3$ accumulated in regenerant (ft.$^3$ basis) |
|---|---|---|---|
| 1 | 98 | 3.08 | 3.08 |
| 2 | 93 | 2.85 | 5.93 |
| 3 | 87 | 2.72 | 8.65 |
| 4 | 82 | 2.55 | 11.20 |
| 5 | 72 | 2.25 | 13.45 |

The chromate content in the regenerant solution, after 5 regenerations, had increased to 13.45 lbs. $CrO_3$, equivalent to 21.8 lbs. $Na_2CrO_4$. Overall strip of $CrO_3$ was 86% of actual $CrO_3$ loading and was accomplished with a net dosage of 4 lbs. $NaNO_3$ and 1.0 lb. NaOH/ft.$^3$ of resin.

$Na_2SO_4$ regeneration: Five columns, prepared as indicated above, but with the resin converted to $SO_4$ form, were each exhausted on test water to an average of 3.12 lbs. $CrO_3$ per cubic foot. The starting regenerant solution was 20 lbs. $Na_2SO_4$, applied as a 1.6% solution, with one pound of NaOH (to pH 11.5). This solution was used for regeneration of the five columns, as described above. Regenerant flow rate was 1 g.p.m./ft.$^3$; ionic forms of resin prior to regeneration were primarily chromate and sulfate. Separate additions of 1 lb. NaOH to the regenerant were made for the tests on columns 1, 4 and 5; no NaOH addition was made for tests on columns 2 and 3. Table IIIB tabulates the results obtained:

Table IIIB

REUSE OF $Na_2SO_4$ REGENERANT FOR A TOTAL OF FIVE COLUMN REGENERATIONS

| Column No. | Percent $CrO_3$ recovered per column (3.12 lbs./ft.$^3$) | Lbs. $CrO_3$ recovered per column | Lbs. $CrO_3$ accumulated in regenerant |
|---|---|---|---|
| 1[1] | 48 | 1.54 | 1.54 |
| 2[2] | 30 | 0.96 | 2.5 |
| 3[2] | 17 | 0.54 | 3.04 |
| 4[1] | 32 | 1.03 | 4.07 |
| 5[1] | 37 | 1.17 | 5.24 |

[1] pH of regenerant adjusted to 11.35.
[2] pH of regenerant not adjusted.

After 5 generations, the chromate content of the regenerant had increased to 5.24 lbs. $CrO_3$, or 8.5 lbs. $Na_2CrO_4$. It is evident upon comparison with the nitrate series results that sulfate salts are not as efficient as nitrates, and that pH adjustment of the regenerant is required for maximum chromate recovery.

The following experiments, therefore, were conducted with sodium nitrate for regenerating columns exhausted with cooling tower blowdown water (test water).

REGENERATION OF CHROMATE EXHAUSTED NALCITE SBR COLUMNS WITH REUSE OF SPENT $NaNO_3$ REGENERANT

Resins: Six columns of Nalcite SBR, each 100 ml. in resin volume, were prepared. Each column was exhausted (with simulated cooling tower blowdown water) to 2.5–2.6 lbs. $CrO_3$ loading on a cubic foot basis. The ionic forms of the resins after exhausting were: chromates (mixture of dichromates and chromates), sulfates, chlorides and traces of nitrates and phosphates. The resins were backwashed and settled before regeneration.

Regeneration: The object of these tests were feasibility of maximum reuse (efficiency increase) of regenerant by applying 20 lbs. sodium nitrate/ft.$^3$ regenerant (plus 1 lb. NaOH), and finally a neutral "chaser" of 20 lbs. $NaNO_3$ to recover any excess hydrate placed onto the exchange sites by the first two regenerants. Complete $CrO_3$ strip, and complete conversion of resin to nitrate form was expected.

The application of a neutral chaser also served to prevent precipitation of hardness present in the blowdown water when the resin is again placed in service (which otherwise would occur due to salt splitting by OH⁻ form exchanger).

Flow rates were adjusted to assure a minimum contact time of one hour. Each regenerant solution was followed by a brief water rinse to displace (recover) the bulk of the regenerant from the resin.

The spent regenerant solution and chasers were reused for additional regenerations, i.e., up to test column No. 6 as indicated in Table IIIC.

*Table IIIC*

REGENERATION OF CHROMATE-EXHAUSTED NALCITE SBR WITH NaNO₃/NaOH REGENERANT, REGENERANT RECOVERY AND RINSE (CUBIC FOOT BASIS)

| | Solution 1 | Solution 2 | Solution 3 |
|---|---|---|---|
| | 20 lb. NaNO₃/ 10% 1 lb. NaOH | 20 lb. NaNO₃/ 10% 1 lb. NaOH | 20 lb. NaNO₃/ 10% |
| Column 1 (Theoretical recovery, 2.5–2.6 lbs. CrO₃): | | | |
| Lbs. CrO₃ recovered, spent regenerant | 2.50 | 0.10 | 0-trace |
| Percent recovery CrO₃* | 96.0 | 3.9 | 0-trace |
| pH spent regenerant | | | 10.75 |
| Column 2 (Theoretical recovery, 5.0–5.2 lbs. CrO₃): | | | |
| Lbs. CrO₃ recovered, spent regenerant | 4.73 | 0.38 | 0.03 |
| Percent recovery CrO₃* | 91.0 | 7.3 | 0.58 |
| pH spent regenerant | | | 10.95 |
| Column 3 (Theoretical recovery, 7.5–7.8 lbs. CrO₃): | | | |
| Lbs. CrO₃ recovered, spent regenerant | 5.41 | 2.24 | 0.04 |
| Percent recovery CrO₃* | 69.4 | 28.7 | 0.51 |
| pH spent regenerant | | | 11.05 |
| Column 4 (Theoretical recovery, 10.0–10.4 lbs. CrO₃): | | | |
| Lbs CrO₃ Recovered, spent regenerant | 7.16 | 3.09 | 0.10 |
| Percent recovery CrO₃* | 68.8 | 29.7 | 0.97 |
| pH spent regenerant | | | 11.25 |
| Column 5 (Theoretical recovery, 12.5–13.0 lbs. CrO₃): | | | |
| Lbs. CrO₃ Recovered, spent regenerant | 6.56 | 6.26 | 0.30 |
| Percent Recovery CrO₃* | 50.5 | 48.2 | 2.3 |
| pH spent regenerant | | | 11.35 |
| Column 6 (Theoretical recovery, 15.0–15.6 lbs. CrO₃): | | | |
| Lbs. CrO₃ recovered, spent regenerant | 6.09 | 8.40 | 1.02 |
| Percent recovery CrO₃* | 39.1 | 53.90 | 6.55 |
| pH spent regenerant | | | 11.45 |

*Percent recovery based on highest theoretical recovery value.

These data confirm the feasibility of reuse of regenerant in successive exhausted bed regenerations not only to restore the resin completely to the salt form (nitrate in this instance) and recover chromate for reuse, but also to obtain maximum utility of the regenerant. For example, the initial regenerating solution (Solution 1) might be reused a total of four times (column 4) before the buildup of chromate and depletion of nitrate would make it necessary to remove it from the regeneration system; under these conditions, the net sodium nitrate-sodium hydroxide dosage would be 5 lbs. NaNO₃/0.25 lb. NaOH per cubic foot of exchange material.

Studies of the spent regenerant (Solution 1) after use on column 4 indicates substantial depletion of nitrate ion; the product was essentially all chromate, with only minor amounts of chlorides and sulfates (from the previous exhaustion cycles).

In practice, where a back-up regenerant (Solution 2) would be employed, the initial regenerant (Solution 1) might well be used for 5 regenerations. It is apparent that somewhere between 4 and 5 regenerations, the buildup of chromate reaches the value where chromate contained in the regenerant actually acts as regenerant for the resin, exerting its effect over the effect of the depleted nitrate ion.

Obviously, other regenerants, such as sodium sulfate, sodium chloride, etc., will perform in a fashion similar to the example, sodium nitrate.

As the data of Table IIIC suggest, where the pH of the third regenerant (Solution 3) increases during regenerant cycling, decrease in the amount of added caustic is possible, further reducing regeneration costs.

SPENT REGENERANT CHARACTERISTICS

Analysis of spent regenerant typically obtained from regenerant recycle operations demonstrate a high chromate to regenerant salts ratio, important where the recovered chromate is returned to cooling tower service. Table IIID illustrates the characteristics of a spent nitrate regenerant after cyclic use:

*Table IIID*

SPENT REGENERANT COMPOSITION AFTER MAXIMUM REGENERANT UTILITY

| | |
|---|---|
| Net sodium nitrate application, lbs./ft.³ resin | 5.0 |
| Net sodium hydroxide application, lbs./ft.³ resin | 1.0 |
| Maximum (theoretical) chromate recovery, lbs./ft.³ resin | 3.0 |
| Actual net chromate recovery, lbs./ft.³ resin | 2.6 |
| Ratio CrO₄ to other anions | 1.0 to 0.75 |

The composition shown demonstrates the feasibility of returning substantially all chromate discharged in blowdown waste to the cooling system in small volume without correspondingly large amounts of regenerant salts. At the chromate dosage commonly applied to cooling tower makeup water, the other salts would have substantially no effect upon the dissolved solids, and would not alter the blowdown rate.

Based on the above examples, it has been shown that it is possible to remove chromates from aqueous solutions containing other dissolved anions and to selectively collect these materials in a relatively concentrated form. After these materials are collected, they may be pH adjusted, treated with other known corrosion inhibiting chemicals and reused to treat industrial cooling systems to maintain a non-corrosive environment, thereby allowing the system to operate at maximum efficiency.

The invention also allows a means for selectively regenerating chromate exhausted anion exchange resins whereby the chromate is efficiently removed by use of simple, inexpensive chemical regenerants. The invention also provides a method for treating various types of chromate containing systems which may, or may not, contain other dissolved solids, whereby chromates are selectively removed, and which may, by the use of a particular regenerant treatment, be concentrated for purposes of disposal or use in various types of chemical and industrial processing operations.

The expressions "chromate" and "chromates" as used herein refer to hexavalent chromium compounds, e.g., chromates, acid chromate and dichromates.

The invention is hereby claimed as follows:

1. A process for maintaining a non-corrosive environment in industrial process water systems which comprises the steps of treating said systems with a chromate based corrosion inhibitor to provide a chromate dosage, expressed as CrO₃, greater than 1 part per million, but not in excess of 1,000 parts per million, maintaining the pH within the range of from 5.0–8.0, continuing the operation of said systems until the dissolved solids build up excessively, removing at least a portion of the water contained in said system to provide a blowdown fraction, adjusting the pH of this blowdown fraction to not greater than 6.5, contacting this blowdown fraction with a strong base anion exchange resin which has as its exchangeable anion the anion of a strong mineral acid whereby the chromates contained in the blowdown fraction are selectively retained by the resin thereby forming a chromate free fraction, discarding the chromate free fraction, continuing to contact the anion exchange resin with blowdown fraction until the resin is substantially exhausted with chromate, regenerating the chromate exhausted resin at least once with the same mineral acid salt solution which has a pH of at least 8.5, collecting the chromate removed from the strong base anion resin, and then returning the collected chromate to the system for reuse.

2. The process of claim 1 where the pH of the blowdown fraction is adjusted to between 4.0 and 6.0.

3. The process of claim 1 where the mineral acid salt solution has a pH within the range of 10.5–13.5.

4. The process of claim 3 where the mineral acid salt solution is a solution of an alkali metal nitrate.

5. The process of claim 3 where the amount of alkali metal nitrate solution is an 8 to 15% by weight solution.

6. A method for selectively removing and recovering chromates from aqueous liquids which contain other ionized dissolved solids and not more than 1,000 parts per million of chromates expressed as $CrO_3$, which comprises the steps of adjusting the pH of such aqueous liquids so that it does not exceed 6.5, contacting such liquids with a strong base anion exchange resin which has as its exchangeable anion the anion of a strong mineral acid, whereby the chromates contained in the aqueous liquids are selectively retained by the resin, continuing to contact the strong base anion exchange resin with the aqueous liquid until the resin is substantially exhausted with chromate, regenerating the chromate exhausted resin at least once with a mineral acid salt solution which has a pH of at least 8.5, and then collecting the chromate removed from the strong base anion exchange resin by the mineral acid salt solution regenerant.

7. A method of regenerating a strong base anion exchange resin which is in the chromate form which comprises contacting said resin with an 8–15% by weight aqueous solution of a mineral acid salt which has a pH within the range of from 8.5 to 13.5.

8. The method of claim 7 where the mineral acid salt solution is an alkali metal nitrate solution and the pH is within the range of 10.5 to 13.5.

References Cited by the Examiner

UNITED STATES PATENTS

| | | | |
|---|---|---|---|
| 2,733,304 | 1/1956 | Costa | 210—30 |
| 2,825,659 | 3/1958 | Dalton et al. | 23—145 X |
| 3,027,321 | 3/1962 | Selm et al. | 210—59 |

MORRIS O. WOLK, *Primary Examiner.*